April 9, 1963  F. K. BROMWELL  3,084,467
BOW-AND-ARROW FISHING TACKLE
Filed June 28, 1961  2 Sheets-Sheet 1
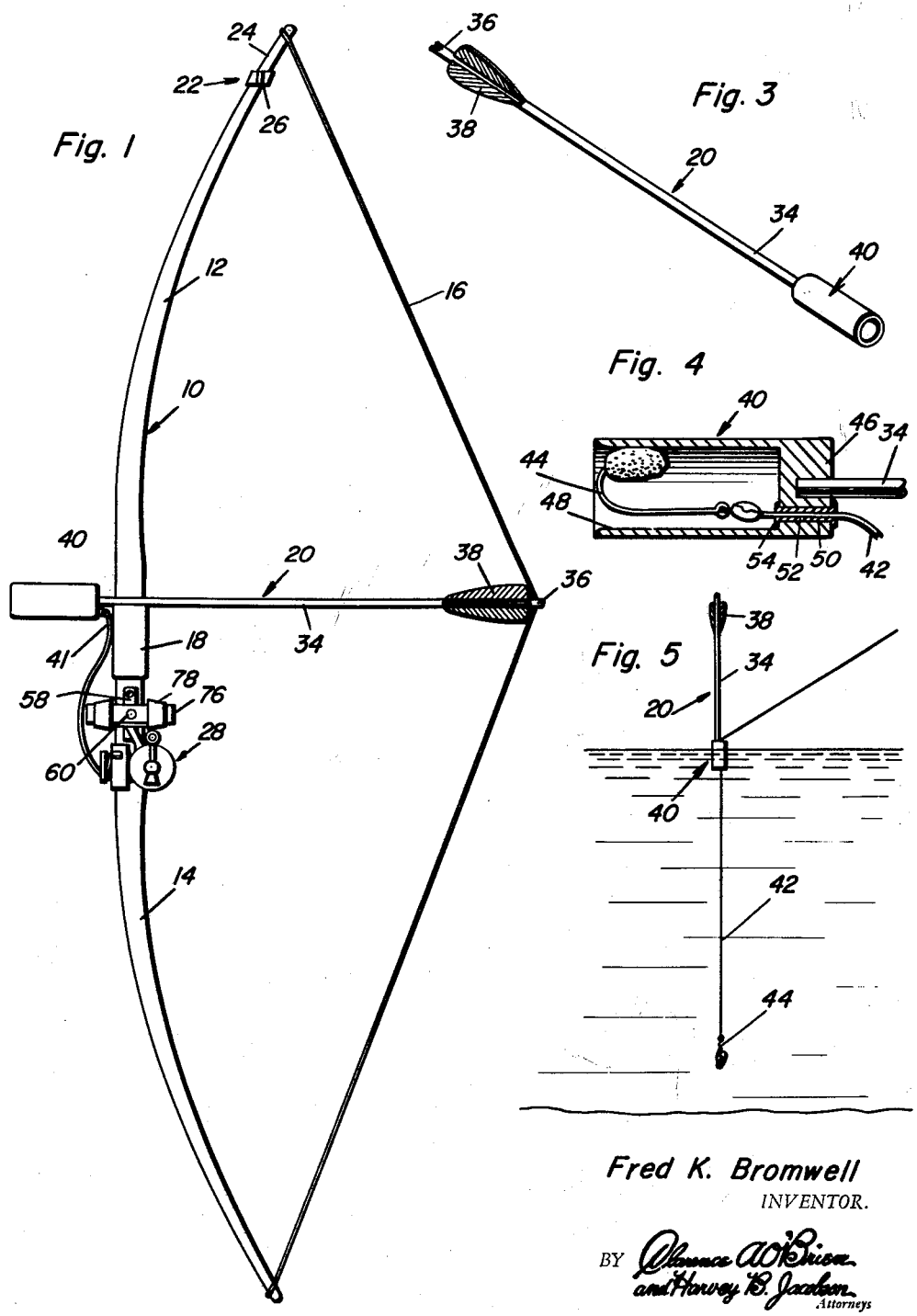
Fred K. Bromwell
INVENTOR.

April 9, 1963
F. K. BROMWELL
3,084,467
BOW-AND-ARROW FISHING TACKLE
Filed June 28, 1961
2 Sheets-Sheet 2
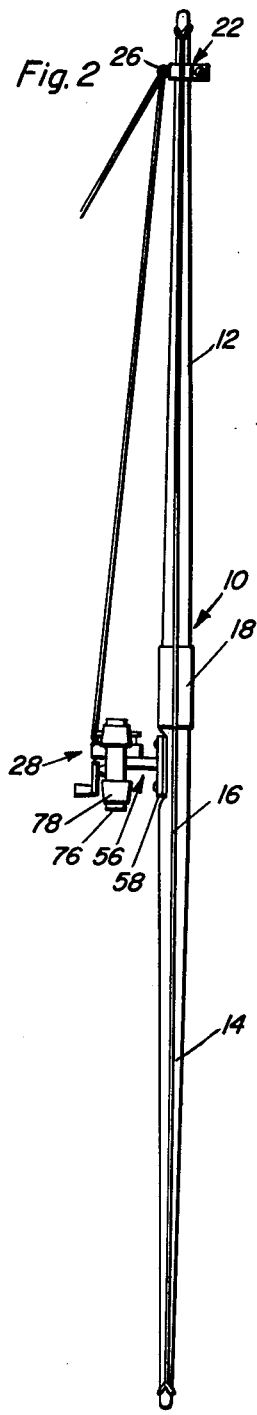
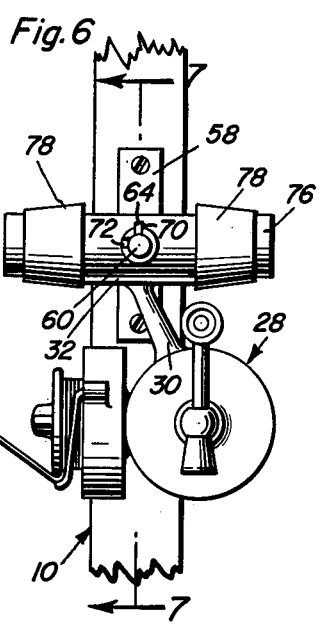
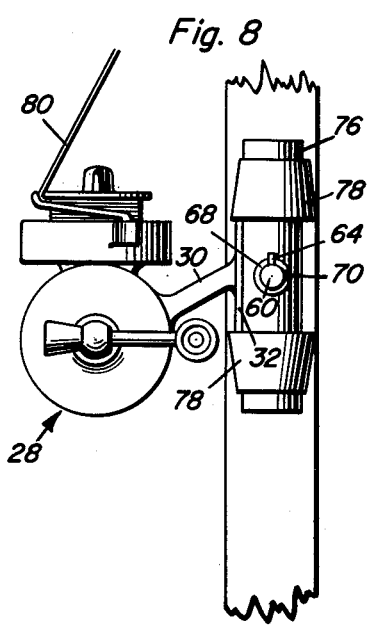
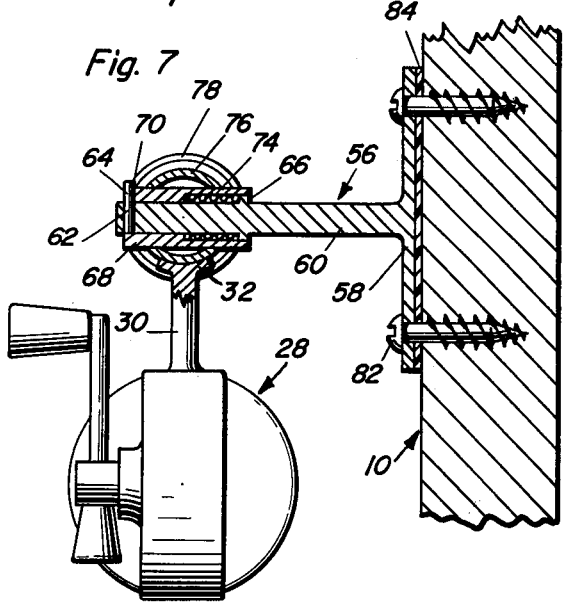
Fred K. Bromwell
INVENTOR.
BY *Clarence A. O'Brien*
*and Harvey B. Jackson*
Attorneys United States Patent Office 3,084,467
Patented Apr. 9, 1963

3,084,467
BOW-AND-ARROW FISHING TACKLE
Fred K. Bromwell, Grayling, Mich., assignor of ninety percent to Thane G. Hendershot, Grayling, Mich.
Filed June 28, 1961, Ser. No. 120,373
4 Claims. (Cl. 43—19)

The present invention relates to bow-and-arrow fishing but has reference more particularly to an improved fishing tackle characterized by a bow, an arrow, reel and novel means positioning and mounting the reel on the bow.

Despite the recognized interest in and popularity of bow-and-arrow fishing no bow has apparently been designed which is expressly or peculiarly adapted for fishing. As a matter of fact almost any bow that will deliver an arrow solidly and accurately at reasonable fishing ranges is suitable and adaptable. Of course, it is necessary to take into consideration such prerequisites of the weight of the bow and the pull but bows which are being used appear to be wood-glass models. Insofar as the underlying principles of the present concept are concerned a conventional bow is disclosed. But unlike harpon-type arrows and the like, which are currently being used, the instant invention has to do with an improved arrow construction. Many and varied styles and forms of reels are in vogue in tackle stores and being recommended for archery fishing. In carrying out the present invention a conventional-type spinning reel is being used.

More specifically it is an object of the instant invention to provide an improved arrow. To this end the fletching or feathers and usual nock remain unchanged at the trailing end of the shaft. Therefore, the essence of the invention is in the head construction which is unique in that it has the form of a specially designed cup having features to be hereinafter revealed.

As to the bow, and as already suggested, the bow proper and bowstring and grip are not changed. The reel is positioned and mounted on the bow through the medium of a novel adapter. In addition to the reel adapter a line guide is provided at the upper or top end of the flexibly resilient bow. The adapter is such that it allows the reel to be shifted from a normal fishing position which expedites paying the line out and is then shiftable to a position at right angles to the normal position or from horizontal to vertical to enable the angler to run the payed out line through a guide provided therefor whereby to thus resort to the use of the bow as a fishing rod, as it were.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing the bow-and-arrow fishing equipment or tackle constructed in accordance with the invention and illustrating the bowstring positioned to project the aimed special arrow and to bring the line and reel into play;

FIGURE 2 is a rear view, that is a view observing the structure of FIGURE 1 in a direction from right to left and wherein the fishing line has been propelled or projected and a portion thereof above the adapter placed releasably and guidingly through a guide eye;

FIGURE 3 is a view in perspective of the arrow by itself;

FIGURE 4 is a view in section and elevation and on an enlarged scale showing the head or cup with the coiled fishing line and baited hook therein in readiness to be released upon striking the water;

FIGURE 5 is a view on a smaller scale and somewhat diagrammatically shown and illustrating the arrow atop the water and with the cup down and the fishing line released and the baited hook readied for the catch;

FIGURE 6 is a fragmentary view in elevation on a suitably enlarged scale to emphasize the featured adapter and wherein the same is in the horizontal position illustrated in FIGURE 1;

FIGURE 7 is a view in section and elevation and on a larger scale taken on the section line 7—7 of FIGURE 6 looking in the direction of the arrows; and FIGURE 8 is a view based on and similar to FIGURE 6 and also in elevation but showing the changeover of the adapter with the same now in a vertical or perpendicular fishing position (see FIG. 2).

With respect to FIGURES 1 and 2 and particularly FIGURE 1 the bow means is more or less standard or conventional and is provided with the customary longitudinally curved bow 10 having an upper end portion 12 and a lower end portion 14. The bowstring is denoted at 16. The central hand-grip, of any suitable type, is denoted by the numeral 18 and is used in aiming and directing the flight of the projectible line propelling arrow 20. There is a simple clamp 22 on the upper end portion 24 which clamp is provided with a line receiving and guiding hook 26. The reel 28 is a conventional spin-type structure and embodies, among other features, the supporting and attaching shank 30 (FIG. 7) and the attaching and retaining foot 32.

Referring now to the improved arrow it should be noted that it is made of buoyant material so that it actually becomes a bobber or float when it has the position illustrated atop the water in FIGURE 5. This arrow comprises a shaft 34 the trailing end of which is fashioned into an ordinary nock 36 adjacent to which suitable fletching or feathers 38 are provided. The head 40 is unique and is of the construction illustrated in FIGURE 4. Broadly the head constitutes a holder for the outer end portion 42 of the line and the attached fishhook 44. Specifically the head comprises a wooden or an equivalent buoyant cup having a bottom 46 with a socket into which the forward end of the shaft is fitted in the manner illustrated. The receptacle portion 48 of the cup opens through the leading or forward end. The base to one side of the shaft is provided with a passage as at 50 which is open-end and lined with a sleeve 52 of suitable material and having beaded or flanged ends 54 to facilitate sliding movement of the line without subjecting the same to undue friction and chafing. Therefore insofar as the arrow is concerned it is improved by way of the original or unique line and hook accommodating, holding and releasing head shown in FIGURE 4. It might be explained that when the line is reeled in on the reel 28 the arrow is, of course, retrieved and may be rebaited and shot out again after the necessary steps for rebaiting have been accomplished.

Whereas it is general practice for archery fishermen to tape or otherwise improvise means for attaching the reel to the median part of the bow the present concept takes this problem into consideration and offers a practical and acceptable solution. To this end novel adapter means is provided for adjustably mounting the reel 28 on the portion of the bow just below and on one side of a handgrip as illustrated where it is in a satisfactory position for taking the desired aim and paying out the line and carrying on the activities in a successful manner.

Broadly the adapter means allows the reel to have the prerequisite positions for aiming and shooting the arrow 20 in the manner illustrated in FIGURE 1 and then assuming the second position, the fishing position, illustrated in FIGURE 2. More specifically the adapter comprises a substantially T-shaped bracket 56 (FIG. 7) said bracket comprising an attaching base 58 and a shank 60, said shank provided at the outer or terminal end with a simple detent comprising a pin 62 anchored in place and with its upper end 64 projecting above the shank. The intermediate portion of the shank is provided with an outstanding endless flange 66 on which the axially socketed end portion of the turning sleeve 68 is slidingly mounted. The outer end of this sleeve is provided with circumferentially spaced keeper notches 70 and 72 (FIGS. 6 and 8) which may be selectively engaged with the detent or keeper 64. A simple coil spring 74 is housed and confined in the socket and bears at one end against the closed bottom of the socket and at the opposite end against the shoulder-forming flange 66. With this construction the rotating sleeve is spring-loaded and projectible and retractible and functions in the manner brought out in FIGS. 6 and 8, respectively. This sleeve is fixed in an opening provided therefor at the median or central portion of a larger sleeve or cylinder 76. This cylinder is of the approximate length illustrated in FIGS. 6 and 8. The projecting end portions (FIG. 6) are provided with collars 78 which surround the same and whose inner end portions provide annular grooves or receivers for the end portions of the attaching foot 32 on the reel's shank 30. As already pointed out the reel 28 is of a conventional type and is here shown as a spinning reel and is to be construed as any suitable reel. The foot 32 can be placed against a surface of a cylinder and the collars 78, which serve as locks or fasteners can be applied to hold the foot removably in place. Equipped with the spring-loaded sleeve 68 and the keeper means the cylinder may be latched and held in the horizontal position shown in FIG. 6 and then alternately turned with the sleeve on the shaft or shank 60 and adjusted to assume the vertical latched position depicted in FIG. 8. The original or normal position is the horizontal position shown in FIG. 6 which is the arrow shooting position as is apparently evident. In the position designated as FIG. 1 the end portion 42 of the fishing line may be coiled and stored in the bottom of the receptacle portion 48 of the cup 40. In this position the bait hook is also enclosed. When the bowstring is properly snapped according to the technique which the archery fisherman employs the arrow 20 is shot out to the fishing spot designated in FIG. 5. When the line has thus payed out from the reel and the arrow lands on the water it becomes a float or bobber. Having accomplished this the fisherman then makes the adjustment required to shift the reel and adapter to the position of FIG. 6 to the position of FIG. 8 whereupon the line comes off the reel as indicated at 80. Then the line is passed through the aforementioned guide hook 26 and the bow then becomes what is, in effect, a fishing rod or pole.

In practice any suitable fasteners 82 may be provided for fastening the base of the bracket 58 to the bow. In addition and if desired a packing strip or filler 84 may be interposed between the bow and the base.

As will be understood the invention is not to be confused with a sharp pointed arrow which pierces its target. It has to do with a new idea and theory which involves casting the bait a long distance with reasonable accuracy and when the arrow strikes the water's surface the baited hook emerges from the open end of the receptacle portion of the cup and lands on the water and functions as a bobber for normal fishing. The flanged liner 52 (FIG. 4) is utilized to prevent excessive wear on the fishing line.

It may be added that the invention herein shown, described and claimed has been experimentally used with recognized success. It well serves the purposes for which it is intended.

It is believed that a careful consideration of the description in conjunction with the drawing will enable the reader to obtain a clear and comprehensive understanding of the construction, mode of use, and features and advantages of the invention. Therefore, a more lengthy description is believed to be unnecessary.

Minor changes in shape, size, materials and rearrangement of component parts may be resorted to in actual practice without departing from the spirit of the invention or the scope of the invention as claimed.

What is claimed as new is as follows:

1. For use by an archery fisherman, a conventional-type bow and an arrow, said bow provided with a centrally located pivotable reel containing a line spool having a fishing line reeled thereon, the outer end of said line being provided with a baited hook, said arrow having a shaft with a head at the leading end thereof, said head being constructed to releasably hold the hook during the flight of the arrow, said arrow adapted to be projected by the bow in the normal manner, said reel spool being pivotably adjustable between a first position wherein the spool axis is orientated perpendicular to the longitudinal axis of the bow and parallel to the axis of the arrow, and a second position wherein the spool axis is orientated parallel to the longitudinal axis, said bow further being provided with a line guide means positioned near its upper end, said reel spool being orientated in its first position during casting and playing out of the line under the influence of the projected arrow, said playing out of the line being directly off the reel spool substantially perpendicular to the bow, said reel spool being orientated in its second position for use of the bow in the manner of a conventional fishing rod, said line, when said reel spool is in its second position, extending through said guide means for reeling and unreeling in a conventional manner.

2. The combination of claim 1 including an adapter mounting the reel on the bow, said adapter comprising a T-shaped bracket having a leg and a cross portion with the cross portion fastened on a side of the bow and the leg extending perpendicular thereto, an elongated member extending perpendicular to and rotatably mounted on said extending leg, stop means limiting the rotation of the elongated member to two adjusted positions corresponding to the first and second positions of the reel spool, said elongated member provided with a pair of locking collars, one at each end thereof, said reel including an attaching shank extending therefrom and a retaining foot projecting perpendicular from opposite sides of the outer end of said shank, the outer ends of said retaining foot being fixedly secured to the elongated member by engagement by the collars, said reel thereby being rotatable with said elongated member.

3. The combination of claim 1 wherein the arrowhead comprises a forwardly opening receptacle of a width greater than the width of the arrow shaft, said receptacle having a rearward bottom with a passage therethrough located outwardly from the arrow shaft, said passage having a friction-resisting lining means, and the line extending through said passage and lining means for unrestricted movement of said running out or being reeled in.

4. An attachment for attaching a conventional reel to a bow comprising a bracket which is adapted to be connected to the bow, said bracket having a transverse shank, a cylinder provided intermediate its ends with a transverse sleeve which is spring-biased outwardly and mounted for rotation on said shank, the outer end of said sleeve having selectively engageable circumferentially spaced outwardly open keeper notches and the outer end of the shank being provided with a transverse keeper pin fixed and adapted to be selectively seated in said notches, said cylinder having means for attaching the base of a reel thereto, said means comprising a pair of adjustable collars mounted on the cylinder, one collar adjacent each end thereof, whereby the reel in one position may be used in casting by an arrow and in the second position may be used in the manner of a conventional reel, said shank being provided with a stop means intermediate its length, said sleeve having an enlarged socket in its inner end, and a compressed spring means engaged between said stop means and the inner end of said socket so as to produce the desired outward biasing of the sleeve.

References Cited in the file of this patent

UNITED STATES PATENTS

| | | |
|---|---|---|
| 2,531,418 | Fitzharris | Nov. 28, 1950 |
| 2,580,777 | Hewlett | Jan. 1, 1952 |
| 2,703,466 | Badovinac | Mar. 8, 1955 |
| 2,785,868 | Weiss | Mar. 19, 1957 |
| 2,794,288 | Marshall et al. | June 4, 1957 |
| 2,938,514 | Berg | May 31, 1960 |

FOREIGN PATENTS

| | | |
|---|---|---|
| 608,671 | Great Britain | Sept. 20, 1948 |
| 84,236 | Norway | Sept. 13, 1954 |